March 2, 1926.
R. CRUYFF
1,575,319
MILK BOTTLE OPENER AND CAP
Filed April 30, 1925
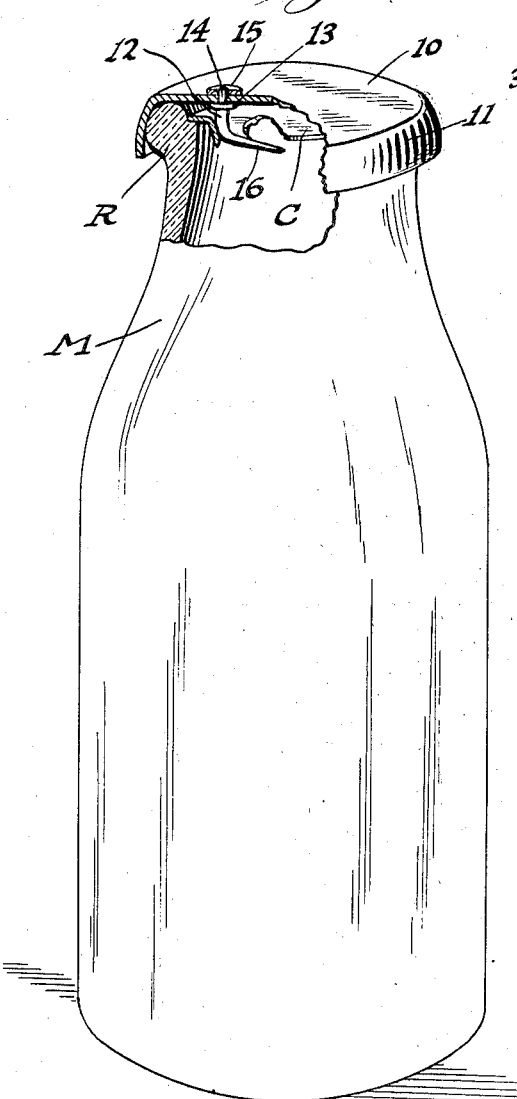
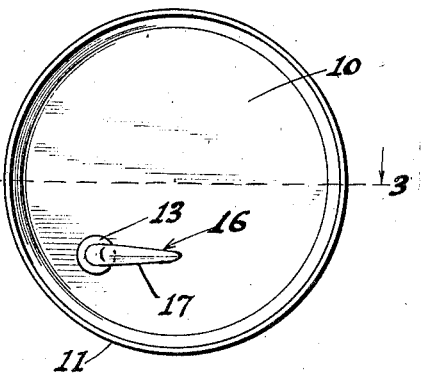
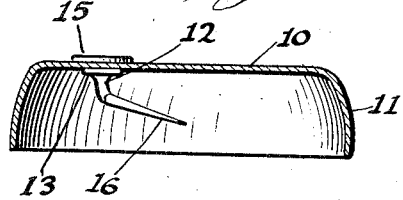
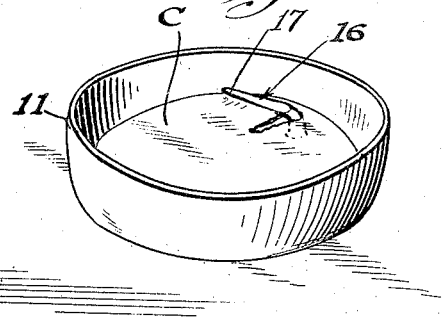
Inventor.
Ryk Cruyff.
By Hazard and Miller
Attorneys.
Witness:

Patented Mar. 2, 1926.

1,575,319

UNITED STATES PATENT OFFICE.

RYK CRUYFF, OF PASADENA, CALIFORNIA.

MILK-BOTTLE OPENER AND CAP.

Application filed April 30, 1925. Serial No. 26,892.

*To all whom it may concern:*

Be it known that I, RYK CRUYFF, a subject of the Queen of Holland, residing at Pasadena, in the county of Los Angeles and State of California, have invented new and useful Improvements in Milk-Bottle Openers and Caps, of which the following is a specification.

This invention relates to improvements in caps and openers for milk bottles.

An object of the invention is to provide a combined cap and opener for milk bottles which can be readily applied to a milk bottle and which has a pointed member associated with the cap, which when the cap is rotated will be caused to puncture the cardboard cap on the milk bottle to permit its being lifted from its seat upon the bottle.

Another object of the invention is to provide a combined cap and opener for milk bottles which has a pointed member so arranged that when it is caused to puncture the milk bottle cap upon rotation of my improved cap, the pointed member will cut the cardboard cap radially outward, so that the pointed member will puncture the cap instead of causing it to rotate upon its seat.

With the foregoing and other objects in view which will be made manifest in the following detailed description and specifically pointed out in the appended claim, reference is had to the accompanying drawings for an illustrative embodiment of the invention, wherein:

Figure 1 is a perspective view of a milk bottle with my improved cap and opener in applied position, parts being broken away and shown in section, Fig. 2 is a bottom plan view of my improved opener and cap, Fig. 3 is a vertical section taken substantially on the line 3—3 of Fig. 2, and Fig. 4 is a perspective view illustrating my improved cap and opener in upside down position with a cardboard milk bottle cap disposed therein.

Referring to the accompanying drawings wherein similar reference characters designate similar parts throughout, my improved combined milk bottle cap and opener consists of a cap preferably formed of sheet metal, such as aluminum, and having a circular center portion 10 provided with a rounded depending flange 11. The flange 11 is so arranged as to be capable of being received over the rim R of the milk bottle M. Within the cap there is disposed a puncturing device consisting of a stud 12 having a shoulder 13 formed therein, which bears against the under side of the center portion 10. The stud is provided with a pin 14 extending through an aperture in the center portion 10, and a suitable clinching washer 15 is placed upon the top of the center portion and engages the pin 14 so as to fasten the stud 12 to the cap. The stud 12 terminates in an angularly bent, pointed member 16, which is somewhat flattened to provide a sharp side cutting edge 17. The pointed member is slightly inclined to the horizontal as clearly shown in Fig. 3. As indicated in Fig. 2, the pointed member 16 is so arranged as to be tangent to a circle having a center which is the center of the circular portion 10, and which has approximately one-half the radius of that of the center portion 10. The pointed member 16 may be considered as being arranged upon a line which is a secant through the circular portion 10.

The operation of the device is as follows: The cap is placed over the rim R of the milk bottle M and forced downwardly upon it with a rotary or twisting motion. By rotating the cap, the point of the pointed member 16 is caused to puncture the cardboard cap which is seated upon the milk bottle M. After the point has punctured the cap C, the sharp side edge 17 upon the pointed member 16 will be caused to cut the cardboard cap radially outward. This radical cutting of the cardboard cap C has a tendency to cause the pointed member 16 to be fully extending through the cap without causing its rotation upon its seat. While the pointed member is being passed through the cardboard cap and causing the radial cutting, it tends to lift that side of the cap which is being cut, thus causing the cap to be lifted in an inclined manner. After the pointed member has been inserted into the cardboard cap C, the cardboard cap can readily be removed from the milk bottle upon lifting the improved cap and opener. If only a part of the contents of the milk bottle are removed and a portion of the contents is allowed to remain in the bottle, the cap and cardboard cap can be replaced upon the bottle and serve as a closure therefor. The improved milk bottle cap and opener of my improved construction can be removed from the cardboard cap C by rotating the cap in a reverse direction from that direction in which it is rotated to puncture the cap, causing the pointed member 16 to be withdrawn from the cardboard cap C.

It will be understood that various changes in the detail of construction may be made without departing from the spirit and scope of the invention as defined by the appended claim.

I claim:

An opener and cap for milk bottles comprising a cap having a depending flange receivable over the rim of a milk bottle, and a single pointed member secured to the cap and extending downwardly therefrom in an inclined position, said pointed member being arranged in a plane tangential to a circle within the cap having a center coaxial with the center of the cap, said pointed member having its pointed end terminating approximately at the point of tangency between said plane and circle and having its outer side sharpened to provide a sharpened side edge as and for the purpose described.

In testimony whereof I have signed my name to this specification.

RYK CRUYFF.